United States Patent
Lee et al.

(10) Patent No.: US 8,604,125 B2
(45) Date of Patent: Dec. 10, 2013

(54) POLYPROPYLENE-BASED RESIN COMPOSITION AND AUTOMOBILE PARTS USING THE SAME

(75) Inventors: Choong-Hoon Lee, Daejeon (KR);
Jong-Chan Lee, Daejeon (KR);
Dong-Kyu Park, Daejeon (KR);
Yang-Kee Kim, Daejeon (KR);
Jong-Joo Ha, Daejeon (KR);
Byung-Kwon Lim, Daejeon (KR);
Kyung-Seok Min, Yongin-si (KR);
Don-Ho Kum, Daejeon (KR)

(73) Assignee: LG Chem, Ltd. (KR)

( * ) Notice: Subject to any disclaimer, the term of this patent is extended or adjusted under 35 U.S.C. 154(b) by 644 days.

(21) Appl. No.: 12/489,603

(22) Filed: Jun. 23, 2009

(65) Prior Publication Data
US 2009/0326131 A1 Dec. 31, 2009

(30) Foreign Application Priority Data

Jun. 25, 2008 (KR) .................. 10-2008-0060294

(51) Int. Cl.
*C08L 23/12* (2006.01)
*C08L 23/10* (2006.01)
*C08K 3/00* (2006.01)

(52) U.S. Cl.
USPC ........... 524/584; 524/583; 524/579; 524/451; 524/425; 524/449; 524/445; 525/240

(58) Field of Classification Search
USPC ......... 525/240; 526/351; 348.2; 524/451, 584
See application file for complete search history.

(56) References Cited

U.S. PATENT DOCUMENTS

| | | | | |
|---|---|---|---|---|
| 6,011,102 A | * | 1/2000 | Shimojo et al. | 524/451 |
| 6,075,116 A | * | 6/2000 | Moriwaki et al. | 528/310 |
| 6,500,223 B1 | * | 12/2002 | Sakai et al. | 71/64.07 |
| 6,590,038 B2 | * | 7/2003 | Yu et al. | 525/240 |
| 2010/0087609 A1 | * | 4/2010 | Park et al. | 526/170 |

FOREIGN PATENT DOCUMENTS

| | | | | |
|---|---|---|---|---|
| CN | 1435442 A | | 8/2003 | |
| CN | 1563173 A | | 1/2005 | |
| WO | WO 2004/039852 A1 | * | 5/2004 | C08F 210/16 |
| WO | 2007111423 A1 | | 10/2007 | |
| WO | WO 2008/140205 A1 | * | 11/2008 | C08F 210/16 |

* cited by examiner

*Primary Examiner* — Rip A. Lee
(74) *Attorney, Agent, or Firm* — Lerner, David, Littenberg, Krumholz & Mentlik, LLP

(57) ABSTRACT

The present invention provides a polypropylene-based resin composition, which comprises of a) a polypropylene; b) an ethylene 1-octene copolymer in which $r_1 r_2 < 1$ (herein, $r_1 = k_{11}/k_{12}$, $r_2 = k_{22}/k_{21}$, $k_{11}$ is a growth reaction rate constant when ethylene is added to a growth chain in which an end active site is ethylene, $k_{12}$ is a growth reaction rate constant when octene is added to a growth chain in which an end active site is ethylene, $k_{22}$ is a growth reaction rate constant when octene is added to a growth chain in which an end active site is octene, and $k_{21}$ is a growth reaction rate constant when ethylene is added to a growth chain in which an end active site is octene); and c) an inorganic filling agent, and a part for vehicles manufactured by using the same.

20 Claims, No Drawings

POLYPROPYLENE-BASED RESIN COMPOSITION AND AUTOMOBILE PARTS USING THE SAME

CROSS-REFERENCE TO RELATED APPLICATION

This application claims priority from Korean Patent Application No. 10-2008-0060294 filed on Jun. 25, 2008, filed in the Korean Intellectual Property Office, the disclosure of which is incorporated herein by reference in its entirety.

The present invention relates to a polypropylene-based resin composition and a part for vehicles using the same. More particularly, the present invention relates to a polypropylene-based, resin composition for vehicle parts, which has high heat deflection temperature (HDT) and excellent flexural strength without a reduction in the other properties, that is, impact strength, elasticity, tensile property and the like, and a part for vehicles using the same.

BACKGROUND OF THE INVENTION

In general, a composition for interior and exterior deco parts of vehicles is mainly composed of polypropylene (PP) and a polypropylene-based resin composition that includes an impact modifier and an inorganic filler has been used.

Before the middle of 1990's at which an ethylene α-olefine copolymer that is polymerized by applying a metallocene catalyst was developed, as the material of the interior and exterior decos of vehicles, particularly, a material of a bumper cover, a polypropylene-based resin composition which is mixed with EPR or EPDM as an impact modifier was mainly used. However, after the ethylene α-olefine copolymer that is manufactured by the metallocene catalyst has been used, as an impact modifier, the ethylene α-olefine copolymer starts to be used, and recently, the ethylene α-olefine copolymer has been mainly used. The reason for this is that the polypropylene-based complex material using this has uniform properties such as impact strength, elasticity, bending strength and the like, and good shapability, and is low-priced.

Since polyolefine that is synthesized by the metallocene catalyst is uniformly controlled in terms of molecular structure as compared to the Ziegler-Natta catalyst, it has a narrow molecular weight distribution and excellent mechanical properties. Since in the case of the low density ethylene elastomer which is polymerized by the metallocene catalyst, the α-olefine copolymerization monomer is relatively uniformly inserted into the polyethylene (PE) molecule as compared to the use of the Ziegler-Natta catalyst, while low density rubber properties are maintained, excellent other mechanical properties are ensured.

SUMMARY OF THE INVENTION

It is an object of the present invention to provide a polypropylene-based resin composition that is used for manufacturing vehicle parts which have high heat deflection temperature and excellent flexural strength without a reduction in the other properties, and a part for vehicles that is manufactured by using the same.

The present invention provides a polypropylene-based resin composition, which comprises a) a polypropylene; b) an ethylene 1-octene copolymer in which $r_1 r_2 < 1$; and c) an inorganic filler. Herein, $r_1$ and $r_2$ are defined by using the following Equations.

$$r_1 = k_{11}/k_{12}$$

$$r_2 = k_{22}/k_{21}$$

$k_{11}$: a growth reaction rate constant when ethylene is added to a growth chain in which an end active site is ethylene, $k_{12}$: a growth reaction rate constant when octene is added to a growth chain in which an end active site is ethylene, $k_{22}$: a growth reaction rate constant when octene is added to a growth chain in which an end active site is octene, $k_{21}$: a growth reaction rate constant when ethylene is added to a growth chain in which an end active site is octene).

It is preferable that b) the ethylene 1-octene copolymer in which $r_1 r_2 < 1$ has a molecular weight distribution (Mw/Mn) that is less than 3.5 and a density that is defined by the following Equation.

$$10^3 \times d \leq -1.8 \times A + 937$$

Herein, d is a density of a copolymer and A is wt % of 1-octene in the copolymer.

The ethylene 1-octene copolymer may be manufactured by using the transition metal compound that is represented by the following Formula 1.

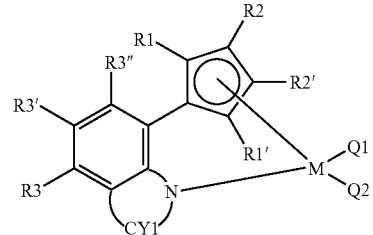

Formula 1 wherein,

R1, R1', R2, R2', R3, R3' and R3" are the same as or different from each other, and each independently hydrogen; a halogen radical; an alkyl radical having 1 to 20 carbon atoms, an aryl radical having 6 to 20 carbon atoms or a silyl radical; an alkenyl radical having 2 to 20 carbon atoms, an alkylaryl radical having 7 to 20 carbon atoms or an arylalkyl radical having 7 to 20 carbon atoms; or a Group 14 metalloid radical substituted with hydrocarbyl having 1 to 20 carbon atoms; or an alkoxy radical having 1 to 20 carbon atoms, an aryloxy radical having 6 to 20 carbon atoms or an amino radical, and two or more of them may be connected to each other by an alkylidene radical containing an alkyl radical having 1 to 20 carbon atoms or an aryl radical having 6 to 20 carbon atoms to form an aliphatic or aromatic ring;

CY1 is a substituted or unsubstituted aliphatic or aromatic ring, in which CY1 may be substituted with hydrogen; a halogen radical; or an alkyl radical having 1 to 20 carbon atoms or an aryl radical having 6 to 20 carbon atoms, and two or more substituents may be connected to each other to form an aliphatic or aromatic ring;

M is a Group 4 transition metal; and

Q1 and Q2 are the same as or different from each other, and each independently a halogen radical; an alkyl amido radical having 1 to 20 carbon atoms or an aryl amido radical having 6 to 20 carbon atoms; an alkyl radical having 1 to 20 carbon atoms, an alkenyl radical having 2 to 20 carbon atoms, an aryl radical having 6 to 20 carbon atoms, an alkylaryl having 7 to 20 carbon atoms or arylalkyl radical having 7 to 20 carbon atoms; or alkylidene radical having 1 to 20 carbon atoms.

The polypropylene-based resin composition according to the present invention has excellent mechanical strength, that is, flexural strength, tensile strength, and elongation as compared to a known composition. In particular, since the resin has high heat deflection temperature (HDT), it can well endure hot environment and the summer climate. In the case of when the polypropylene-based resin composition according to the present invention is used as interior and exterior decos of vehicles, such as bumper covers of vehicles, since a thickness of a shaped body can be reduced, the shaped body can be reduced in views of weight.

DETAILED DESCRIPTION

Hereinafter, the present invention will be described in more detail.

The present invention relates to a polypropylene-based resin composition that includes a polypropylene, an impact modifier, and an inorganic filler, and is characterized in that an ethylene 1-octene copolymer in which $r_1 r_2 < 1$ is used as the impact modifier. Herein, $r_1$ and $r_2$ are defined by using the following Equations.

$$r_1 = k_{11}/k_{12}$$

$$r_2 = k_{22}/k_{21}$$

$k_{11}$: a growth reaction rate constant when ethylene is added to a growth chain in which an end active site is ethylene, $k_{12}$: a growth reaction rate constant when octene is added to a growth chain in which an end active site is ethylene, $k_{22}$: a growth reaction rate constant when octene is added to a growth chain in which an end active site is octene, $k_{21}$: a growth reaction rate constant when ethylene is added to a growth chain in which an end active site is octene.

The $r_1 r_2$ is an index that indicates the degree of uniform distribution of ethylene and octene in the ethylene 1-octene copolymer, and the copolymer in which $r_1 r_2 < 1$ has a uniform comonomer distribution unlike a known ethylene copolymer that has a random or block structure comonomer distribution, such that it is possible to manufacture the copolymer having lower density at the same comonomer content and a relatively small amount of octene may be used in order to obtain the copolymer having the same density.

In particular, it is preferable that the ethylene 1-octene copolymer has the density that is defined by the following Equation. In the case of when the density satisfies the following Equation, as compared to the known copolymer, the lower density may be ensured at the same comonomer content.

$$10^3 \times d \leq -1.8 \times A + 937$$

Herein, a is a density of a copolymer and A is wt % of 1-octene in the copolymer.

As described above, the polypropylene-based resin composition that includes the ethylene 1-octene copolymer as the impact modifier may provide vehicle parts that has high heat deflection temperature and flexural strength without reduction in other properties, such as impact strength, elasticity, tensile property, as compared to the polypropylene-based resin composition that includes EPR, EPDM rubber or the known ethylene α-olefine copolymer.

The ethylene 1-octene copolymer may be an alternative copolymer, a block copolymer or a random copolymer, and among them, the random copolymer is preferable.

Mw/Mn of the ethylene 1-octene copolymer is preferably less than 3.5, more preferably not more than 3.0. In the case of when Mw/Mn is within the above range, it is advantageous in views of the less smell problem, of the copolymer and good mechanical property.

In addition, the density of the ethylene 1-octene copolymer is preferably 0.9 g/cm$^3$ or less, and more preferably in the range of 0.86 to 0.88 g/cm$^3$. In the case of when the density is in the above range, it is advantageous in views of elasticity and impact strength.

In addition, the ethylene 1-octene copolymer has a melt index (MI) preferably in the range of 0.1 to 70 g/10 min and more preferably in the range of 0.5 to 10 g/10 min. In addition, the ethylene 1-octene copolymer has the molecular weight (Mw) preferably in the range of 20,000 to 1,000,000 and more preferably in the range of 50,000 to 500,000. This component is included preferably in the range of 10 to 40 wt % and more preferably in the range of 20 to 30 wt % in the total composition.

In the ethylene 1-octene copolymer, the molar ratio of ethylene:1-octene may be in the range of 1:99 to 99:1. In addition, the content of ethylene in the ethylene 1-octene copolymer is preferably in the range of 50 to 99 wt %, more preferably in the range of 55 to 80 wt %, and most preferably in the range of 55 to 75 wt %. In the case of when the content of ethylene is in the above range, it is advantageous in views of high HDT and flexural strength without reduction in other properties, such as impact strength, elasticity, tensile property and the like.

The ethylene 1-octene copolymer that has the above properties is a thermoplastic elastomer (TPE), which may be manufactured by using an activated catalyst composition that includes a Group IV transition metal compound which is coordinated with a monocyclopentadienyl ligand to which a quinoline-based amino group is introduced.

In this manufacturing process, a continuous solution polymerization process that can perform, polymerization at a wide temperature and pressure range may be used. The Group IV transition metal compound which is coordinated with a monocyclopentadienyl ligand to which a quinoline-based amino group is introduced may be represented by the above Formula 1.

In Formula 1, preferably, R1, R1', R2, and R2' are each independently hydrogen; an alkyl radical having 1 to 20 carbon atoms, an aryl radical having 6 to 20 carbon atoms or a silyl radical; an alkenyl radical having 2 to 20 carbon atoms, an alkylaryl radical having 7 to 20 carbon atoms, or an arylalkyl radical having 7 to 20 carbon atoms; or a metalloid radical of Group 14 metal that is substituted by hydrocarbyl having 1 to 20 carbon atoms, and two or more of R1, R1', R2, and R2' may be connected to each other by an alkylidine radical that includes an alkyl radical having 1 to 20 carbon atoms or an aryl radical having 6 to 20 carbon atoms to form a ring, and R3, R3' and R3" are each independently hydrogen; a halogen radical; or an alkyl radical having 1 to 20 carbon atoms, an aryl radical having 6 to 20 carbon atoms, an alkoxy radical having 1 to 20 carbon atoms, an aryloxy radical having 6 to 20 carbon atoms, or an amino radical having 6 to 20 carbon atoms, and two or more of R3, R3' and R3" may be connected to each other to form an aliphatic or aromatic ring.

A preferable example of the compound represented by Formula 1 is a compound represented by following Formula 2:

Formula 2

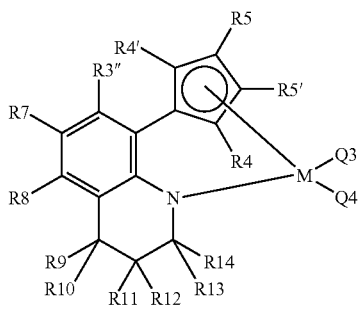

wherein,

R4, R4', R5, R5' and R6 to R14 are the same as or different from each other, and each independently hydrogen; a halogen radical; an alkyl radical having 1 to 20 carbon atoms, an aryl radical having 6 to 20 carbon atoms or a silyl radical; an alkenyl radical having 2 to 20 carbon atoms, an alkylaryl radical having 7 to 20 carbon atoms or an arylalkyl radical having 7 to 20 carbon atoms; or a Group 14 metalloid radical substituted with hydrocarbyl having 1 to 20 carbon atoms; or an alkoxy radical having 1 to 20 carbon atoms, an aryloxy radical having 6 to 20 carbon atoms or an amino radical, and two or more of them may be connected to each other by an alkylidene radical containing an alkyl radical having 1 to 20 carbon atoms or an aryl radical having 6 to 20 carbon atoms to form an aliphatic or aromatic ring;

M is a Group 4 transition metal; and

Q3 and Q4 are the same as or different from each other, and each independently a halogen radical; an alkyl amido radical having 1 to 20 carbon atoms or an aryl amido radical having 6 to 20 carbon atoms; an alkyl radical having 1 to 20 carbon atoms, an alkenyl radical having 2 to 20 carbon atoms, an aryl radical having 6 to 20 carbon atoms, an alkylaryl having 7 to 20 carbon atoms or arylalkyl radical having 7 to 20 carbon atoms; or alkylidene radical having 1 to 20 carbon atoms.

In Formula 2, preferably, R4, R4', R5 and R5' are each independentaly hydrogen; or an alkyl radical having 1 to 20 carbon atoms, an aryl radical having 6 to 20 carbon atoms or a silyl radical; R6 to R14 are each independentaly an alkyl radical having 1 to 20 carbon atoms or an aryl radical having 6 to 20 carbon atoms; an alkenyl radical having 2 to 20 carbon atoms, an alkylaryl radical having 7 to 20 carbon atoms or an arylalkyl radical having 7 to 20 carbon atoms; or an alkoxy radical having 1 to 20 carbon atoms, an aryloxy radical having 6 to 20 carbon atoms or an amino radical, and two or more of R6 to R14 may be connected to form an aliphatic or aromatic ring; and Q3 and Q4 are each independently a halogen radical; an alkyl amido radical having 1 to 20 carbon atoms or an aryl amido radical having 6 to 20 carbon atoms; or an alkyl radical having 1 to 20 carbon atoms.

It is preferable that the compound that is represented by Formula 2 is a compound that is represented by the following Formula 3 or 4:

Formula 3

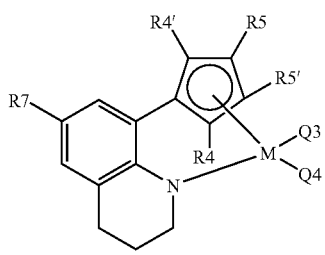

In Formula 3, the substituent groups are defined like Formula 2.

Formula 4

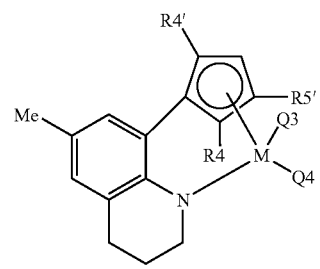

In Formula 4, the substituent groups are defined like Formula 2.

Of transition metal compound represented by Formula 1, preferred compounds to control the electronic or steric environment around the metal, include transition metal compounds of following structures:

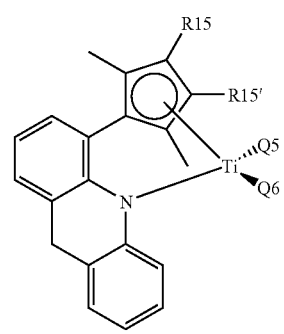

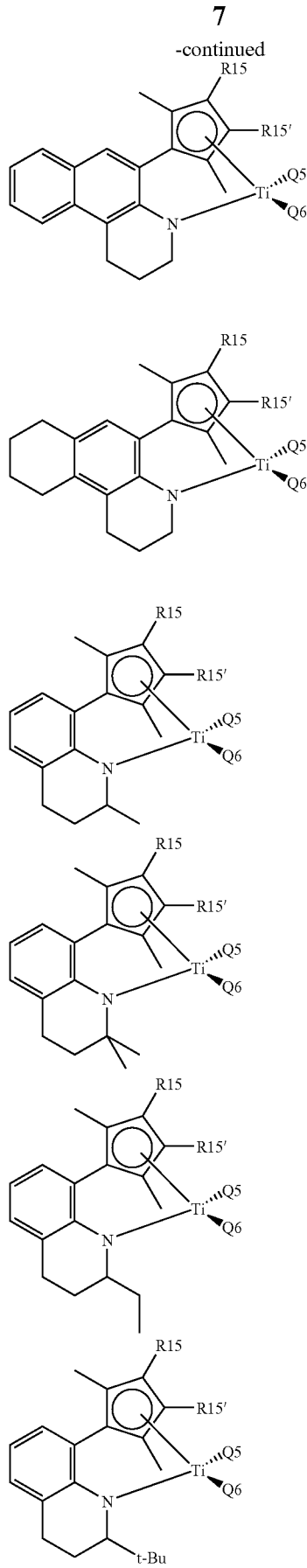

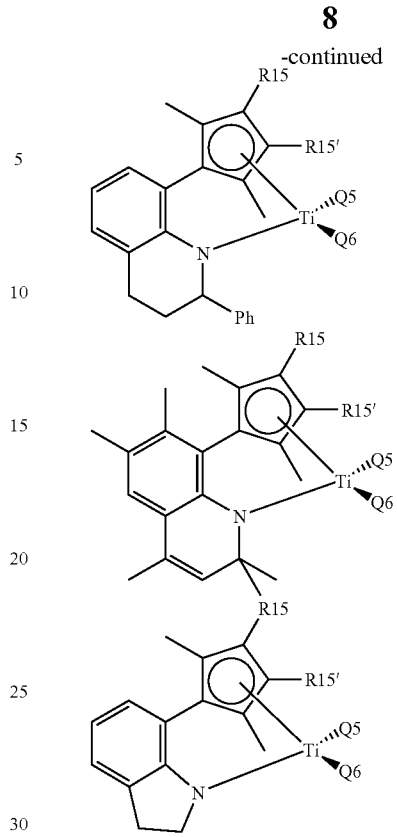

wherein, R15 and R15' are each independently selected from hydrogen or a methyl radical; and Q5 and Q6 are each independently selected from a methyl radical, dimethylamido radical or chloride radical.

In the method of producing the polyolefin copolymer according to the present invention, one or more of the compounds that are represented by the following Formulae 5 to 7 may be used in conjunction with the compound that is represented by Formula 1:

$$-[Al(R16)-O]_a-\qquad\text{Formula 5}$$

wherein,

R16 are each independently a halogen radical; a hydrocarbyl radical having 1 to 20 carbon atoms; or a hydrocarbyl radical having 1 to 20 carbon atoms which is substituted with halogen; a is an integer of 2 or more;

$$D(R17)_3\qquad\text{Formula 6}$$

wherein,

D is an aluminium or boron; R17 are each independently a halogen radical, a hydrocarbyl radical having 1 to 20 carbon atoms, or a hydrocarbyl radical having 1 to 20 carbon atoms which is substituted with halogen; and $$[L-H]^+[ZA_4]^-\text{ or }[L]^+[ZA_4]^-\qquad\text{Formula 7}$$

wherein,

L is neutral or cationic Lewis acid; H is a hydrogen atom; Z is an element of Group 13, such as B, Al, Ga, In, Ti and the like; and A are each independently an aryl radical having 6 to 20 carbon atoms or an alkyl radical having 1 to 20 carbon atoms, at least one hydrogen atom of which is substituted with halogen, an hydrocarbyl radical having 1 to 20 carbon atoms, an alkoxy radical having 1 to 20 carbon atoms or phenoxy radical.

In the present invention, the ethylene 1-octene copolymer that is used as the impact modifier may be manufactured by manufacturing a catalyst composition using the transition metal compound that is represented by Formula 1 and one or more compounds that are represented by Formulas 5 to 7, and then polymerizing ethylene and octane by using them. The catalyst composition may be manufactured by using the following method for manufacturing the composition.

First, there is provided a method that comprises the steps of contacting the transition metal complex compound that is represented by Formula 1 and the compound that is represented by Formula 5 or Formula 6, such that a mixture is obtained; and adding the compound that is represented by Formula 7 to the mixture.

Second, there is provided a method that comprises the step of contacting the transition metal complex compound that is represented by Formula 1 and the compound that is represented by Formula 5, such that the catalyst composition is manufactured.

Third, there is provided a method that comprises the step of contacting the transition metal complex compound that is represented by Formula 1 and the compound that is represented by Formula 7, such that the catalyst composition is manufactured.

In the first method among the methods for producing the catalytic composition, the molar ratio of the transition metal compound of the Formula 1 and the compound represented by the Formula 5 or 6 is preferably 1:2 to 1:5,000, more preferably 1:10 to 1:1,000, and most preferably 1:20 to 1:/500. In the case of when the molar ratio is in the above range, since the amount of the alkylating agent is sufficient, the alkylating of the metal compound may be completely carried out. And side reactions between the remaining alkylating agent in the excessive amount and an activating agent of Formula 7 may be minimized.

Next, the molar ratio of the transition metal compound that is represented by the Formula 1 and the compound that is represented by the Formula 7 is preferably 1:1 to 1:25, more preferably 1:1 to 1:10, and most preferably 1:2 to 1:5. In the case of when the molar ratio is in the above range, since the amount of the activation agent is sufficient, the activation of the transition metal compound may be completely performed, thus the activity of the produced catalytic composition may be remained highly. Also, the amount of the remaining activation agent is not too large. Accordingly, the cost of the catalytic composition is economic and the purity of the polymer is good.

In the second method for producing the catalytic composition, the molar ratio of the transition metal compound of the Formula 1 and the compound that is represented by the Formula 5 is preferably 1:10 to 1:10,000, more preferably 1:100 to 1:5,000, and most preferably 1:500 to 1:2,000. In the case of when the molar ratio is in the above range, since the amount of the activation agent is sufficient, the activation of the metal compound may be completely performed, thus the activity of the produced catalytic composition may be remained highly. Also, the amount of the remaining activation agent is not too large. Accordingly, the cost of the catalyst composition is economic and the purity of the polymer is good.

Meanwhile, in the third method for producing the catalytic composition, the molar ratio of the transition metal compound of the Formula 1 and the compound that is represented by the Formula 7 is preferably 1:1 to 1:25, more preferably 1:1 to 1:10, and most preferably 1:2 to 1:5. In the case of when the molar ratio is in the above range, since the amount of the activation agent is sufficient, the activation of the metal compound may be completely performed, thus the activity of the produced catalytic composition may be remained highly. Also, the amount of the remaining activation agent is not too large. Accordingly, the cost of the catalytic composition is economic and the purity of the polymer is good.

In the production of the activated catalytic composition, as the reaction solvent, a hydrocarbon solvent such as pentane, hexane, heptane, etc., or an aromatic solvent such as benzene, toluene, etc. can be used. However, the reaction solvent is not limited to the above, and all the solvent that is available in the art may be used.

In addition, the transition metal compounds that are represented by Formula 1 and the cocatalysts may be used as supported on silica or alumina.

Preferable examples of the compound represented by Formula 5 are methylaluminoxane, ethylaluminoxane, isobutylaluminoxane, butylaluminoxane etc., and more preferable compound is methylaluminoxane, but not limited thereto if it is and alkylaluminoxane.

Examples of the compound represented by Formula 6 include trimethylaluminium, triethylaluminium, triisobutylaluminium, tripropylaluminium, tributylaluminium, dimethylchloroaluminium, triisopropylaluminium, tri-s-butylaluminium, tricyclopentylaluminium, tripentylaluminium, triisopentylaluminium, trihexylaluminium, trioctylaluminium, ethyldimethylaluminium, methyldiethylaluminium, triphenylaluminium, tri-p-tolylaluminium, dimethylaluminiummethoxide, dimethylaluminiumethoxide, trimethylboron, triethylboron, triisobutylboron, tripropylboron, tributylboron, and so on, and more preferable compound is selected from trimethylaluminium, triethylaluminium and triiobutylaluminium, but not limited thereto.

Examples of the compound represented by Formula 7 include triethylammonium tetraphenyl boron, tributylammonium tetraphenyl boron, trimethylammonium tetraphenyl boron, tripropylammonium tetraphenyl boron, trimethylammonium tetra(p-tolyl)boron, trimethylammonium tetra(o,p-dimethylphenyl)boron, tributylammonium tetra(p-triflouromethylphenyl)boron, trimethylammonium tetra(p-triflouromethylphenyl)boron, tributylammonium tetrapentaflourophenyl boron, N,N-diethylanilinium tetraphenyl boron, N,N-diethylanilinium tetraphenyl boron, N,N-diethylanilinium tetrapentafluorophenyl boron, diethylammonium tetrapentafluorophenyl boron, triphenylphosphonium tetraphenyl boron, trimethylphosphonium tetraphenyl boron, triethylammonium tetraphenyl aluminium, tributyl ammonium tetraphenyl aluminium, trimethylammonium tetraphenyl aluminum, tripropylammonium tetraphenyl aluminium, trimethylammonium tetra(p-tolyl)aluminium, tripropylammonium tetra(p-tolyl) aluminium, triethylammonium tetra(o,p-dimethylphenyl)aluminium, tributylammonium tetra(p-trifluoromethylphenyl)aluminium, trimethylammonium tetra(p-trifluoromethylphenyl)aluminium, tributylammonium tetrapentafluorophenyl aluminium, N,N-diethylanilinium tetraphenyl aluminium, N,N-diethylanilinium tetrapentafluorophenyl aluminium, diethylammonium tetrapentafluorophenyl aluminium, triphenylphosphonium tetraphenyl aluminium, trimethylphosphonium tetraphenyl aluminium, tripropylammonium tetra(p-tolyl) boron, triethylammonium tetra(o,p-dimethylphenyl)boron, tributylammonium tetra(p-trifluoromethylphenyl)boron, N,N-diethylanilinium tetraphenyl boron, triphenylcarbonium tetra(p-trifluoromethylphenyl)boron, triphenylcarbonium tetrapentafluorophenyl boron, and the like.

In the polymerization of the ethylene 1-octene copolymer that is used as the impact modifier in the present invention, the most preferable polymerization process using the catalyst composition that includes the compound that is represented by Formula 1 is a solution process, and if the this composition is used in conjunction with an inorganic carrier such as silica, it may be applied to a slurry or gas-phase process.

The catalyst composition may be introduced by dissolving or diluting it to an aliphatic hydrocarbon solvent having 5 to 12 carbon atoms, for example, pentane, hexane, heptane, nonane, decane, and their isomers; an aromatic hydrocarbon solvent such as toluene, benzene; a hydrocarbon solvent that is substituted with chlorine atom such as dichloromethane, chlorobenzene, etc. It is preferable to use the solvent after removing a little water or air which acts as a catalyst poison, by treating the solvent with a little alkylaluminium. It is also possible to add co-catalyst to the solvent.

The catalyst composition for manufacturing the ethylene 1-octene copolymer that is used in the present invention is described in detail in Korean Patent Application No. 10-2006-26992 which is applied by the present applicator on Mar. 24, 2006, and all contents of this document are incorporated in the present specification.

In the present invention, as the polypropylene, any thing that is used in the art may be used without a limitation. For example, a high crystalline homopolypropylene, a block copolymer that includes ethylene or a mixture thereof may be used. Polypropylene is included preferably in the range of 50 to 90 wt % on the basis of total composition and more preferably in the range of 65 to 75 wt %.

In the present invention, as the inorganic filler, any thing that is used in the art may be used without a limitation. For example, talc, potassium carbonate, mica, clay and the like may be selected and used according to the purpose thereof. The inorganic filler is included preferably in the range of 5 to 20 wt % on the basis of the total composition and more preferably in the range of 7 to 12 wt %.

The polypropylene-based resin composition according to the present invention may further include an antioxidant, a UV stabilizer, a slip agent and the like in a small amount as other additives.

In the present invention, by using the above polypropylene-based resin composition, it is possible to provide vehicle parts that have high heat deflection temperature and flexural strength without a reduction in other properties, that is, impact strength, elasticity, and tensile property. As a method for manufacturing the vehicle parts, a technology that is known in the art may be used. In the present invention, as the vehicle parts that can be manufactured by using the polypropylene-based resin composition, any thing that is manufactured by using the known polypropylene-based resin composition may be included regardless of the kind thereof. For example, there are a bumper cover for vehicles, a glove box, a pillar and the like.

In the present invention, it may be provided a method for manufacturing vehicle parts by using the polypropylene-based resin composition. The method for manufacturing vehicle parts according to the present invention may include an injection molding method, an extrusion molding method and the like which are well known in the art, but is not limited thereto.

EXAMPLES

Hereinbelow, the present invention will be described in detail with reference to Examples. However, the following Examples are set forth to illustrate, but are not to be construed to limit the present invention.

The property evaluation method that is used in the present invention is described in the following Table 1.

TABLE 1

Test methods and conditions

| Test item | Method | Condition |
|---|---|---|
| Density | ASTM D792 | 23° C. |
| Melt Index (MI, 2.16 kg) | ASTM D1238 | 2.16 kg, 190° C. |
| Melting Point | DSC[1] | |
| Crystallinity | DSC | |
| Heat Flow of Melting Peak | DSC | |
| Tensile Strength at Yield | ASTM D638 | 50 mm/min |
| Elongation at Break | ASTM D638 | 50 mm/min |
| Flexural Strength | ASTM D790 | ¼", 10 mm/min |
| Flexural Modulus | ASTM D790 | ¼", 10 mm/min |
| Izod Impact Strength, notched | ASTM D256 | ¼", at 23° C. and −30° C. |
| Heat Deflection Temperature | ASTM D648 | 4.6 kg |

[1]DSC: Differential Scanning Calorimetry

Property Evaluation of the Ethylene 1-octene Copolymer

Physical properties of Engage™ 8200 manufactured by DOW, Co. and P8-750 manufactured by LG Chemicals, Co., Ltd. which were the ethylene 1-octene copolymer were measured, and the results thereof are described in the following Table 1. P8-750 manufactured by LG Chemicals, Co., Ltd. was manufactured by using the catalyst compound (R4, R4', R5'=methyl, M=Ti, Q3 & Q4=chloride) that was represented by Formula 4. In order to allow heat hysterises of polymers to be the same while the DSC measurement was performed, while the temperature was increased from normal temperature to 150° C. at a rate of 10° C./min, maintained at that state for 3 min, cooled to −20° C. at a rate of 10° C./min, and increased to 150° C. at a rate of 10° C./min, the measurement was carried out, such that the melt peak which was the heat flow curve at the final step was analyzed. The property evaluation results of ethylene 1-octene copolymer are described in the following Table 2.

TABLE 2

Basic properties of the ethylene 1-octene copolymer

| Test item | DOW Engage ™ 8200 | LG P8-750 |
|---|---|---|
| Density | 0.870 | 0.874 |
| Melt Index (MI, 2.16 kg) | 5.0 | 4.0 |
| r1 * r2 | 1.0 | 0.5 |
| Melting point (° C.) | 62.6 | 60.8 |
| Crystallinity (%) | 12.4 | 14.4 |
| Heat Flow of Melting Peak (J/g) | 35.48 | 41.39 |
| Mw/Mn | 2.34 | 2.46 |
| Ethylene content (wt %) | 36 | 35 |

The equivalent product manufactured by Dow, Co. (the ethylene octene copolymer manufactured using the metallocene catalyst) and the ethylene octene copolymer that was used in the present invention were compared to each other in respects to the basic properties such as the density, the melt index, and the DSC properties (melting point, and crystallinity), and as a result, as shown in Table 2, it could be confirmed that two copolymers having similar densities have very different properties.

Example 1

70 wt % of the 1:1 mixture of HCPP (MI=100) manufactured by Hyosung, Co., Ltd. and CoPP (MI=40) manufactured by SK Chemicals, Co., Ltd. as polypropylene, 20 wt % of P8-750 manufactured by LG Chemicals, Co., Ltd. as the ethylene 1-octene copolymer, 9 wt % of talc, and 1.0 wt % of antioxidant (Irganox 1076) were used, such that the composition was manufactured. P8-750 of LG Chemicals, Co., Ltd. was manufactured by using the catalyst compound (R4, R4', R5'=methyl, M=Ti, Q3 & Q4=chloride) in which r1*r2=0.5 and which was represented by Formula 4.

In order to prepare the test sample for analyzing physical properties, after each component was uniformly mixed by using the Hensel mixer, palletizing was carried out by using the co-rotating twin Screw Extruder, and the test sample was manufactured by using the injection machine. The physical properties of the manufactured test sample are described in the following Table 3.

Comparative Example 1

The composition was manufactured, the test sample was manufactured, and physical properties thereof was measured by using the same method as Example 1, except that Engage™ 8200 (r1*r2=1) manufactured by DOW, Co. was used as the ethylene 1-octene copolymer, and the evaluation results of the physical properties thereof are described in the following Table 3.

TABLE 3

| Test item | Example 1 | Comparative Example 1 |
|---|---|---|
| Density (g/cm$^3$) | 0.870 | 0.870 |
| Melt Index (g/10 min) | 5.0 | 5.0 |
| Flexural Strength (kg/cm$^2$) | 244 | 224 |
| Flexural Elaxticity (kg/cm$^2$) | 11,800 | 10,600 |
| IZOD Impact 23° C. | 39 | 39 |
| Strength (kgcm/cm) −30° C. | 3.8 | 4.2 |
| Tensile Strength (kg/cm$^2$) | 184 | 179 |
| Elongation (%) | 220 | 140 |
| HDT (° C.) | 122 | 114 |

As described in Table 3, it could be seen that the sample manufactured by using the polypropylene-based resin composition according to the present invention had the very excellent physical properties in terms of the flexural strength, the flexural elasticity, the tensile strength, the elongation, and the heat deflection temperature (HDT).

Example 2

The composition was manufactured, the test sample was manufactured, and physical properties thereof was measured by using the same method as Example 1, except that LG-EOR-2 (r1*r2=0.5) manufactured by LG Chemicals, Co., Ltd. was used as the ethylene 1-octene copolymer, and the evaluation results of the physical properties thereof are described in the following Table 4. LG-EOR-2 was manufactured by using the catalyst compound (R4, R4', R5'=methyl, M=Ti, Q3 & Q4=chloride) that was represented by Formula 4.

Comparative Example 2

The composition was manufactured, the test sample was manufactured, and physical properties thereof was measured by using the same method as Example 1, except that Engage™ 8180 (r1*r2=1) manufactured by DOW, Co. was used as the ethylene 1-octene copolymer, and the evaluation results of the physical properties thereof are described in the following Table 4.

TABLE 4

| Test item | Example 2 | Comparative Example 2 |
|---|---|---|
| Density (g/cm$^3$) | 0.865 | 0.863 |
| Melt Index (g/10 min) | 0.48 | 0.48 |
| Flexural Strength (kg/cm$^2$) | 276 | 274 |
| Felxural Elasticity (kg/cm$^2$) | 15,760 | 14,874 |
| IZOD Impact 23° C. | 59 | 61 |
| Strength (kgcm/cm) −30° C. | 5.8 | 5.9 |
| Tensile Strength (kg/cm$^2$) | 177 | 177 |
| HDT (° C.) | 114 | 113 |

Example 3

The composition was manufactured, the test sample was manufactured, and physical properties thereof was measured by using the same method as Example 1, except that LG-EOR-3 (r1*r2=0.6) manufactured by LG Chemicals, Co., Ltd. was used as the ethylene 1-octene copolymer, and the evaluation results of the physical properties thereof are described in the following Table 5. LG-EOR-3 was manufactured by using the catalyst compound (R4, R4', R5'=methyl, M=Ti, Q3 & Q4=chloride) that was represented by Formula 4.

Comparative Example 3

The composition was manufactured, the test sample was manufactured, and physical properties thereof was measured by using the same method as Example 1, except that Engage™ 8130 (r1*r2=1) manufactured by DOW, Co. was used as the ethylene 1-octene copolymer, and the evaluation results of the physical properties thereof are described in the following Table 5.

TABLE 5

| Test item | Example 3 | Comparative Example 3 |
|---|---|---|
| Density (g/cm$^3$) | 0.870 | 0.865 |
| Melt Index (g/10 min) | 7.1 | 10.5 |
| Flexural Strength (kg/cm$^2$) | 289 | 278 |
| Flexural Elasticity (kg/cm$^2$) | 16,537 | 15,530 |
| IZOD Impact 23° C. | 46 | 46 |
| Strength (kgcm/cm) −30° C. | 4.5 | 4.6 |
| Tensile Strength (kg/cm$^2$) | 184 | 180 |
| HDT (° C.) | 119 | 119 |

The polypropylene-based resin composition according to the present invention has excellent mechanical strength, that is, flexural strength, tensile strength, and elongation as compared to a known composition. In particular, since the resin has high heat deflection temperature (HDT), it can well endure hot environment and the summer climate. In the case of when the polypropylene-based resin composition according to the present invention is used as interior and exterior decos of vehicles, such as bumper covers of vehicles, since a shaping thickness can be reduced, the shaped body can be reduced in views of weight.

The invention claimed is:

1. A polypropylene-based resin composition, comprising:
a) a polypropylene;
b) an ethylene 1-octane copolymer in which $0.5 \leq r_1 r_2 < 1$, wherein $r_1 = k_{11}/k_{12}$, $r_2 = k_{22}/k_{21}$, $k_{11}$ is a growth reaction rate constant when ethylene is added to a growth chain in which an end active site is ethylene, $k_{12}$ is a growth reaction rate constant when octene is added to a growth chain in which an end active site is ethylene, $k_{22}$ is a growth reaction rate constant when octane is added to a growth chain in which an end active site is octene, and $k_{21}$ is a growth reaction rate constant when ethylene is added to a growth chain in which an end active site is octane; and c) an inorganic filler, wherein heat deflection temperature (HDT) of the polypropylene-based resin composition ranges from 114° C. to 122° C., wherein HDT is determined according to ASTM D648 at 4.6 kilograms.

2. The polypropylene-based resin composition of claim 1, wherein the ethylene 1-octane copolymer in which $0.5 \leq r_1 r_2 < 1$ has a molecular weight distribution (Mw/Mn) of less than 3.5 and a density that is defined by Equation $10^3 \times d \leq -1.8 \times A + 937$, wherein d is the density of the copolymer and A is wt. % of 1-octane of the copolymer.

3. The polypropylene-based resin composition of claim 1, wherein the ethylene 1-octane copolymer in which $0.5 \leq r_1 r_2 < 1$ has a density of 0.9 g/cm³ or less and a melt index (MI) in the range of 0.1 to 70 g/10 min.

4. The polypropylene-based resin composition of claim 1, wherein the content of the ethylene 1-octane copolymer in which $0.5 \leq r_1 r_2 < 1$ is in the range of 10 to 40 wt %.

5. The polypropylene-based resin composition of claim 1, wherein the ethylene 1-octene copolymer in which $0.5 \leq r_1 r_2 < 1$ is manufactured by using a catalyst composition that includes a transition metal compound that is represented by the following Formula 1:

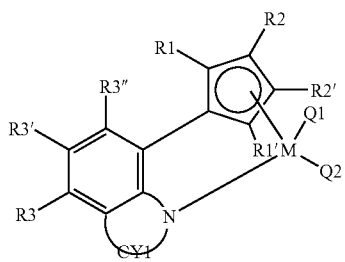

Formula 1 wherein R1, R1', R2, R2', R3, R3' and R3" are the same as or different from each other, and are independently hydrogen; a halogen radical; an alkyl radical having 1 to 20 carbon atom, an aryl radical having 6 to 20 carbon atoms or silyl radical; an alkenyl radical having 2 to 20 carbon atoms, an alkylaryl radical having 7 to 20 carbon atoms, or an arylalkyl radical having 7 to 20 carbon atoms; a metalloid radical of Group 14 metal that is substituted by hydrocarbyl having 1 to 20 carbon atoms; an alkoxy radical having 1 to 20 carbon atoms, an aryloxy radical having 6 to 20 carbon atoms or amino radical, and two or more of the R1, R1", R2, R2', R3, R3' and R3" may be connected to each other by an alkylidene radical that includes an radical having 1 to 20 carbon atoms or aryl radical having 6 to 20 carbon atoms to form an aliphatic or aromatic ring, CY1 is a substituted or unsubstituted aliphatic or aromatic ring, when substituted, a substituent group that is substituted at CY1 is hydrogen; a halogen radical; or an alkyl radical having 1 to 20 carbon atoms or an aryl radical having 6 to 20 carbon atoms, and in the case of when there are a plurality of substituent groups, two or more substituent groups of the substituent groups may be connected to each other to form an aliphatic or aromatic ring;

M is a Group IV transition Metal;

Q1 and Q2 are the same as or different from each other, and are independently a halogen radical; an alkylamido radical having 1 to 20 carbon atoms or an arylamido radical having 6 to 20 carbon atoms; an alkyl radical having 1 to 20 carbon atoms, alkenyl radical having 2 to 20 carbon atoms, aryl radical having 6 to 20 carbon atoms, alkylaryl radical having 7 to 20 carbon atoms or arylalkyl radical having 7 to 20 carbon atoms; or an alkylidene radical having 1 to 20 carbon atoms.

6. The polypropylene-based resin composition of claim 5, wherein the compound that is represented by Formula 1 is a compound that is represented by the following Formula 2:

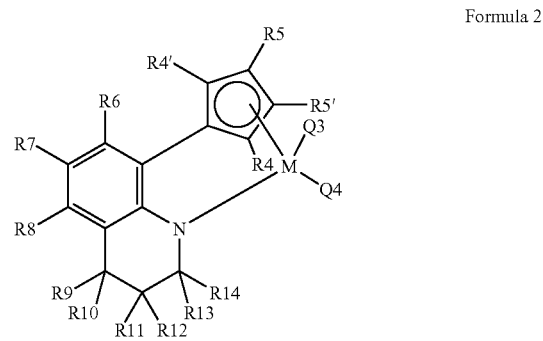

Formula 2 wherein R4, R4', R5, R5', and R6 to R14 are the same as or different from each other, and are independently hydrogen; a halogen radical; an alkyl radical having 1 to 20 carbon atoms, an aryl radical having 6 to 20 carbon atoms or silyl radical; an alkenyl radical having 2 to 20 carbon atoms, an alkylaryl having 7 to 20 carbon atoms, or an arylalkyl radical having 7 to 20 carbon atoms; a metalloid radical of Group 14 metal that is substituted by hydrocarbil having 1 to 20 carbon atoms; or an alkoxy radical having 1 to 20 carbon atoms, or an aryloxy radical having 6 to 20 carbon atoms or amino radical, and two or more of them may be connected to each other by an alkylidine radical that includes an alkyl radical having 1 to 20 carbon atoms, or an aryl radical having 6 to 20 carbon atoms to form an aliphatic or aromatic ring, M is a Group IV transition metal;

Q3 and Q4 are the same as or different from each other, and are independently a halogen radical; an alkylamido radical having 1 to 20 carbon atoms or an arylamido radical having 6 to 20 carbon atoms; an alkyl radical having 1 to 20 carbon atoms, alkenyl radical having 2 to 20 carbon atoms, aryl radical having 6 to 20 carbon atoms, alkylaryl radical having 7 to 20 carbon atoms or arylalkyl radical having 7 to 20 carbon atoms; or an alkylidene radical having 1 to 20 carbon atoms.

7. The polypropylene-based resin composition of claim 6, wherein the compound that is represented by Formula 2 is a compound that is represented by the following Formula 3 or Formula 4:

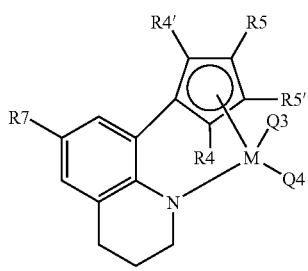

Formula 3

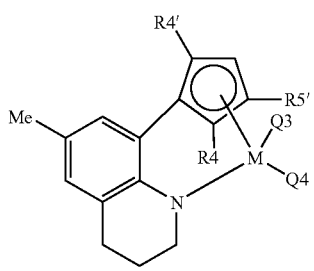

Formula 4 wherein the substituent groups are the same as those of Formula 2.

8. The polypropylene-based resin composition of claim 5, wherein the catalyst composition further comprises one or more of compounds that are represented by the following Formulae 5, 6, and 7:

—[Al(R16)-O]$_a$—   Formula 5 wherein,

R16 are each independently a halogen radical, a hydrocarbyl radical having 1 to 20 carbon atoms, or a hydrocarbyl radical having 1 to 20 carbon atoms which is substituted with halogen, a is an integer of 2 or more;

D(R17)$_3$   Formula 6 wherein,

D is an aluminium or boron, R17 are each independently a halogen radical, a hydrocarbyl radical having 1 to 20 carbon atoms, or a hydrocarbyl radical having 1 to 20 carbon atoms which is substituted with halogen; and

[L-H]$^+$[ZA$_4$]$^-$ or [L]$^+$[ZA$_4$]$^-$   Formula 7 wherein,

L is neutral Lewis acid; H is a hydrogen atom; Z is an element of Group 13; and A are each independently an aryl radical having 6 to 20 carbon atoms or an alkyl radical having 1 to 20 carbon atoms, at least one hydrogen atom of which is substituted with a halogen, an hydrocarbyl radical having 1 to 20 carbon atoms, an alkoxy radical having 1 to 20 carbon atoms or phenoxy radical.

9. The polypropylene-based resin composition of claim 1, wherein the content of the polypropylene is in the range of 50 to 90 wt %.

10. The polypropylene-based resin composition of claim 1, wherein the inorganic filler is selected from the group consisting of talc, calcium carbonate, mica and clay.

11. The polypropylene-based resin composition of claim 1, wherein the content of the inorganic filler is in the range of 5 to 20 wt %.

12. The polypropylene-based resin composition of claim 1, further comprising one or more additives selected from the group consisting of an antioxidant, a UV stabilizing agent, and a slip agent.

13. A part for vehicles, which is manufactured by using the polypropylene-based resin composition of claim 1.

14. The part for vehicles of claim 13, wherein the part for vehicles is selected from the group consisting of a bumper cover for vehicles, a glove box, and a pillar.

15. A polypropylene-based resin composition, comprising:
a) a polypropylene;
b) an ethylene 1-octene copolymer in which $0.5 \le r_1 r_2 < 1$, wherein $r_1 = k_{11}/k_{12}$, $r_2 = k_{22}/k_{21}$, $k_{11}$ is a growth reaction rate constant when ethylene is added to a growth chain in which an end active site is ethylene, $k_{12}$ is a growth reaction rate constant when octane is added to a growth chain in which an end active site is ethylene, $k_{22}$ is a growth reaction rate constant when octane is added to a growth chain in which an end active site is octane, and $k_{21}$ is a growth reaction rate constant when ethylene is added to a growth chain in which an end active site is octene, wherein ethylene content in the ethylene 1-octene copolymer is 35% by weight; and
c) an inorganic filler.

16. The polypropylene-based resin composition of claim 15, wherein the ethylene 1-octene copolymer in which $0.5 \le r_1 r_2 < 1$ is manufactured by using a catalyst composition that includes a transition metal compound that is represented by the following Formula 4

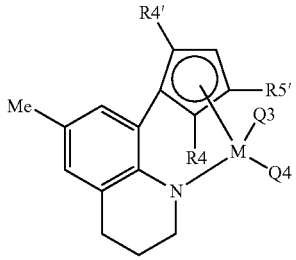

wherein R4, R4', and R5' are methyl groups; M is titanium, Q3 and Q4 are chloride.

17. The polypropylene-based resin composition of claim 15, wherein the content of the polypropylene is in the range of 50 to 90 wt %.

18. The polypropylene-based resin composition of claim 15, wherein the inorganic filler is selected from the group consisting of talc, calcium carbonate, mica and clay.

19. The polpropylene-based resin composition of claim 15, wherein the content of the inorganic filler is in the range of 5 to 20 wt %.

20. The polypropylene-based resin composition of claim 15, further comprising one or more additives selected from the group consisting of an antioxidant, a UV stabilizing agent, and a slip agent.

* * * * *